United States Patent
Waheed et al.

(10) Patent No.: US 9,257,839 B2
(45) Date of Patent: Feb. 9, 2016

(54) SYSTEMS AND METHODS FOR MANAGING MULTIPLE POWER DOMAINS

(71) Applicants: Khurram Waheed, Austin, TX (US); William S. King, Austin, TX (US)

(72) Inventors: Khurram Waheed, Austin, TX (US); William S. King, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 72 days.

(21) Appl. No.: 14/193,921

(22) Filed: Feb. 28, 2014

(65) Prior Publication Data
US 2015/0249335 A1  Sep. 3, 2015

(51) Int. Cl.
- H02J 1/04 (2006.01)
- H01L 31/00 (2006.01)
- H02J 1/14 (2006.01)

(52) U.S. Cl.
CPC ............... H02J 1/14 (2013.01); *Y10T 307/422* (2015.04)

(58) Field of Classification Search
CPC .......................... H02J 1/14; H02M 2001/008
USPC .......................................... 307/33; 257/13, 14
See application file for complete search history.

(56) References Cited

U.S. PATENT DOCUMENTS

| | | | |
|---|---|---|---|
| 7,016,705 B2 | 3/2006 | Bahl et al. | |
| 7,162,279 B2 | 1/2007 | Gupta | |
| 7,564,810 B2 | 7/2009 | Hernandez et al. | |
| 7,812,582 B2 | 10/2010 | Chua-Eoan et al. | |
| 7,921,312 B1 | 4/2011 | Pennanen et al. | |
| 7,945,208 B2 | 5/2011 | Park et al. | |
| 7,996,811 B2 | 8/2011 | Hoberman et al. | |
| 8,427,993 B2 | 4/2013 | Jeyaseelan | |
| 8,484,494 B2 | 7/2013 | Siegel et al. | |
| 2005/0088152 A1* | 4/2005 | McClure et al. | 323/272 |
| 2012/0028151 A1* | 2/2012 | Lin et al. | 429/431 |
| 2012/0072749 A1 | 3/2012 | Conroy et al. | |
| 2012/0086271 A1* | 4/2012 | Jung | H02M 3/00 307/33 |
| 2012/0095703 A1* | 4/2012 | Zakrzewski et al. | 702/42 |
| 2013/0207467 A1* | 8/2013 | Fernald | H02J 1/14 307/31 |

FOREIGN PATENT DOCUMENTS

CN  201263092 Y  6/2009
WO  2012033801 A3  3/2012

* cited by examiner

*Primary Examiner* — Long K Tran

(57) ABSTRACT

A system includes a voltage converter configured to provide a first output voltage at a first output terminal, wherein the first output voltage is from a first group comprising a first high regulation voltage, a first low regulation voltage, and a battery voltage. A first plurality of circuits has power supply terminals coupled to the first output terminal. A power control circuit uses information about operational states of the plurality of circuits to direct the voltage converter to provide the first output voltage from the first group appropriate for the operational states of the first plurality of circuits.

17 Claims, 5 Drawing Sheets

| | MCU POWER MODE | | |
|---|---|---|---|
| | ACTIVE | SLEEP | POWER-DOWN |
| CONFIGURATION 1 | HIGH REGULATION | HIGH REGULATION | LOW REGULATION |
| CONFIGURATION 2 | HIGH REGULATION | LOW REGULATION | LOW REGULATION |

*HIGH REGULATION*
VBAT SLIGHTLY ABOVE VDD_reg2    BYPASS
VBAT ABOVE VDD_reg2             BUCK CONTINUOUS
VBAT BELOW VDD_reg2             BOOST CONTINUOUS

*LOW REGULATION*
VBAT SLIGHTLY ABOVE VDD_reg2    BYPASS
VBAT ABOVE VDD_reg2             BUCK PULSED
VBAT BELOW VDD_reg2             BOOST PULSED

| RADIO POWER MODE | MCU POWER MODE | | |
|---|---|---|---|
| | ACTIVE | SLEEP | POWER-DOWN |
| ACTIVE | HIGH REGULATION | HIGH REGULATION | HIGH REGULATION |
| SLEEP | HIGH REGULATION | USER CONFIGURED | LOW REGULATION |
| POWER-DOWN | HIGH REGULATION | USER CONFIGURED | LOW REGULATION |

*HIGH REGULATION*
VBAT SLIGHTLY ABOVE VDD_reg1    BYPASS
VBAT ABOVE VDD_reg1             BUCK CONTINUOUS
VBAT BELOW VDD_reg1             BOOST CONTINUOUS

*LOW REGULATION*
VBAT SLIGHTLY ABOVE VDD_reg1    BYPASS
VBAT ABOVE VDD_reg1             BUCK PULSED
VBAT BELOW VDD_reg1             BOOST PULSED

FIG. 2

|  | MCU POWER MODE | | |
|---|---|---|---|
|  | ACTIVE | SLEEP | POWER-DOWN |
| CONFIGURATION 1 | HIGH REGULATION | HIGH REGULATION | LOW REGULATION |
| CONFIGURATION 2 | HIGH REGULATION | LOW REGULATION | LOW REGULATION |

*HIGH REGULATION*
VBAT SLIGHTLY ABOVE VDD_reg2    BYPASS
VBAT ABOVE VDD_reg2             BUCK CONTINUOUS
VBAT BELOW VDD_reg2             BOOST CONTINUOUS

*LOW REGULATION*
VBAT SLIGHTLY ABOVE VDD_reg2    BYPASS
VBAT ABOVE VDD_reg2             BUCK PULSED
VBAT BELOW VDD_reg2             BOOST PULSED

FIG. 3

SYSTEMS AND METHODS FOR MANAGING MULTIPLE POWER DOMAINS

BACKGROUND

1. Field

This disclosure relates generally to semiconductor devices, and more specifically, to managing multiple power domains in a semiconductor processing system.

2. Related Art

The ever-increasing growth of the number and types of devices connected to local and global information networks such as the Internet is causing a widespread deployment of connectivity processing systems (CPSs) that include both Radio Frequency transceivers and microprocessors/microcontrollers to provide ubiquitous connectivity between sensors, controllers, and display units, among devices.

The power consumption profile for a CPS is a function of the times the system needs to be in active as well as in lower power mode. Further, the supply voltage and regulation requirements for the CPS can impose a lower limit on the battery voltage that can be used.

In many applications, the CPSs such as System on Chips (SoCs) with analog Radio Frequency (RF) transceivers and digital microprocessors reside in battery powered devices. In order to prolong the battery life, semiconductor manufacturers are constantly seeking ways to reduce the power consumption of their CPSs.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 2 shows an embodiment of regulator modes that can be output by the switching controller of the connectivity processing system of FIG. 1.

FIG. 3 shows another embodiment of regulator modes that can be output by the switching controller of the connectivity processing system of FIG. 1.

DETAILED DESCRIPTION

Embodiments of systems and methods are disclosed herein that include a voltage converter with two or more regulators that receive the same battery voltage and convert the battery voltage to different voltages used by different components in or connected to the system. The power consumption of each regulator in the voltage converter is controlled separately to minimize power consumption during active as well as non-active (low power) modes. The power consumption in the active mode for a connectivity processing system with a radio and a controller is determined by the sum of power required to operate both a radio and a controller. The operational profile of a typical connectivity device shows that the duration that the connectivity processing system needs to be fully active is rather a small percentage of time compared to the amount of time the system spends in low power modes. The systems and methods disclosed herein allow the processing system to minimize power consumption in both active and low power modes by controlling each regulator independently in a combination of voltage (buck, bypass and boost modes), power management, and multiple power domains.

Figure 1:
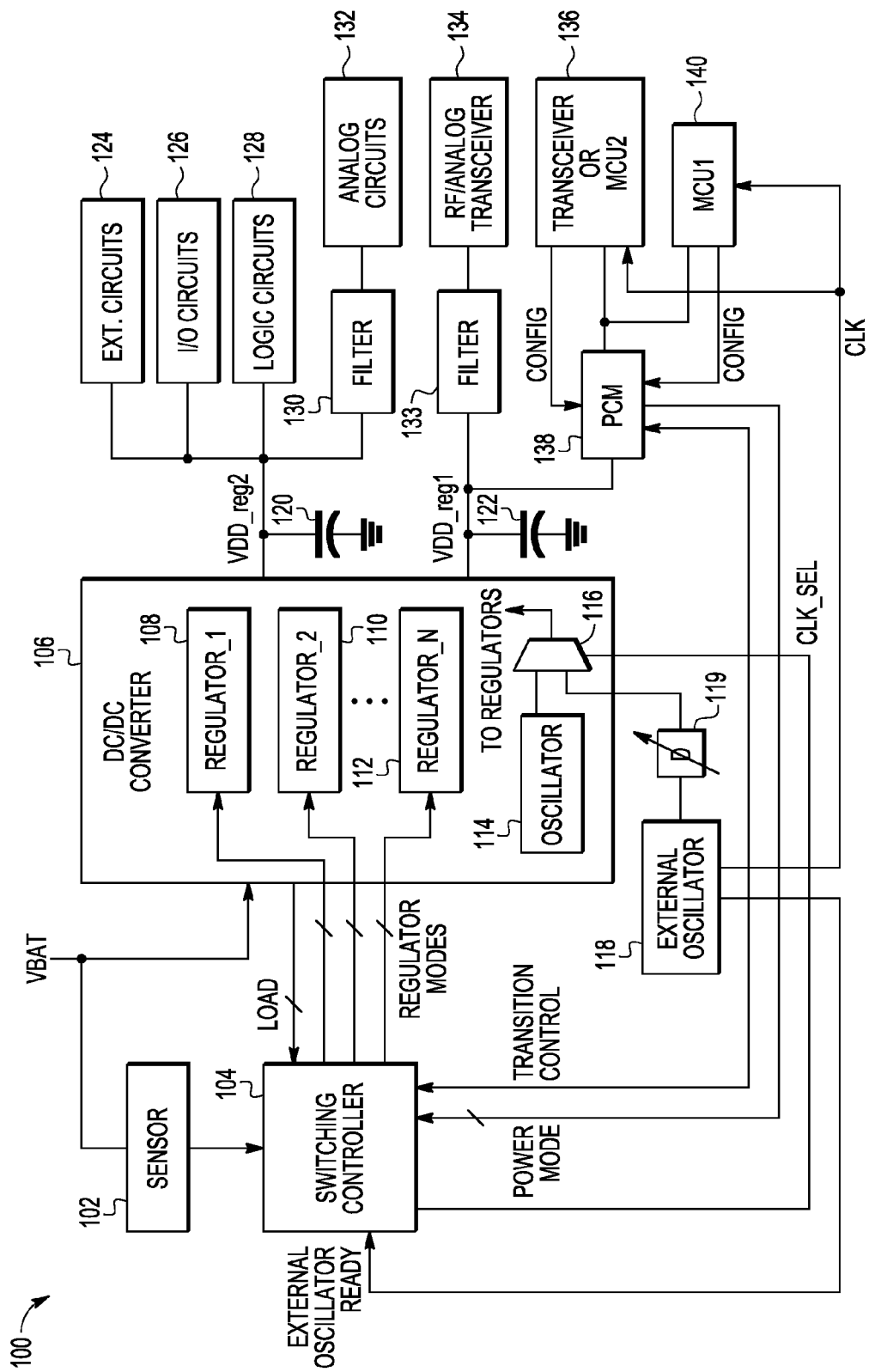
FIG. 1 shows a connectivity processing system in accordance with embodiments of the present invention.

FIG. 1 shows a connectivity processing system 100 in accordance with embodiments of the present invention including sensor 102, switching controller 104, power or voltage converter 106 including regulators 108, 110, 112, internal oscillator 114, and multiplexer 116, external oscillator 118, delay buffer 119, capacitors, 120, 122, external circuits 124, input/output (I/O) circuits 126, logic circuits 128, filters 130, 133, analog circuits 132, analog RF transceiver 134, transceiver/microcontroller unit 136, power microcontroller (PMC) 138, and microcontroller 140. Note that the term "transceiver/microcontroller" can refer to a "transceiver or microcontroller", depending on the circuitry implemented in unit 136.

Battery voltage (VBAT) is coupled to voltage sensor 102 and voltage converter 106. Sensor 102 is coupled to provide a signal indicative of battery voltage VBAT to switching controller 104. Switching controller 104 is coupled to provide regulator mode signals to each regulator 108, 110, 112, and a control signal to multiplexer 116 to select between internal and external oscillators 114, 118.

Voltage converter 106 is coupled to provide voltage signals for one or more power domains to respective circuitry. In the example shown, a first voltage level (VDD_REG1) output by regulator 108 is provided to filter 133 and power management controller (PMC) 138. Capacitor 122 is coupled in parallel between ground and the output of regulator 108 to smooth the VDD_REG1 signal within a specified range of minimum and maximum voltage. Filter 133 is configured to reduce or eliminate noise in the VDD_REG1 signal and to provide the filtered voltage to RF analog transceiver 134. A second voltage level (VDD_REG2) output by regulator 110 is provided to external circuits 124, I/O circuits 126, logic circuits 128, and filter 130. Capacitor 120 is coupled in parallel between ground and the output of regulator 110 to smooth the VDD_REG2 signal within a specified range of minimum and maximum voltage. Filter 130 is configured to reduce or eliminate noise in the VDD_REG2 signal and to provide the filtered voltage to analog circuits 132.

PMC 138 is coupled to provide VDD_REG1 to transceiver/microcontroller unit 136 and to microcontroller unit 140 based on a transition control signal from switching controller 104 and mode configuration signals from microcontroller units 136 and 140. Power mode signals from microcontroller units 136, 140 are provided from PMC 138 to switching controller 104. The transition control signals indicates whether respective microcontroller units 136, 140 are transitioning from power-up to power-down or low-power modes or vice versa, which will dictate the power requirements of the microcontroller units 136, 140. The mode configuration signals indicate the operational state of the microcontroller units 136, 140.

Figure 6:
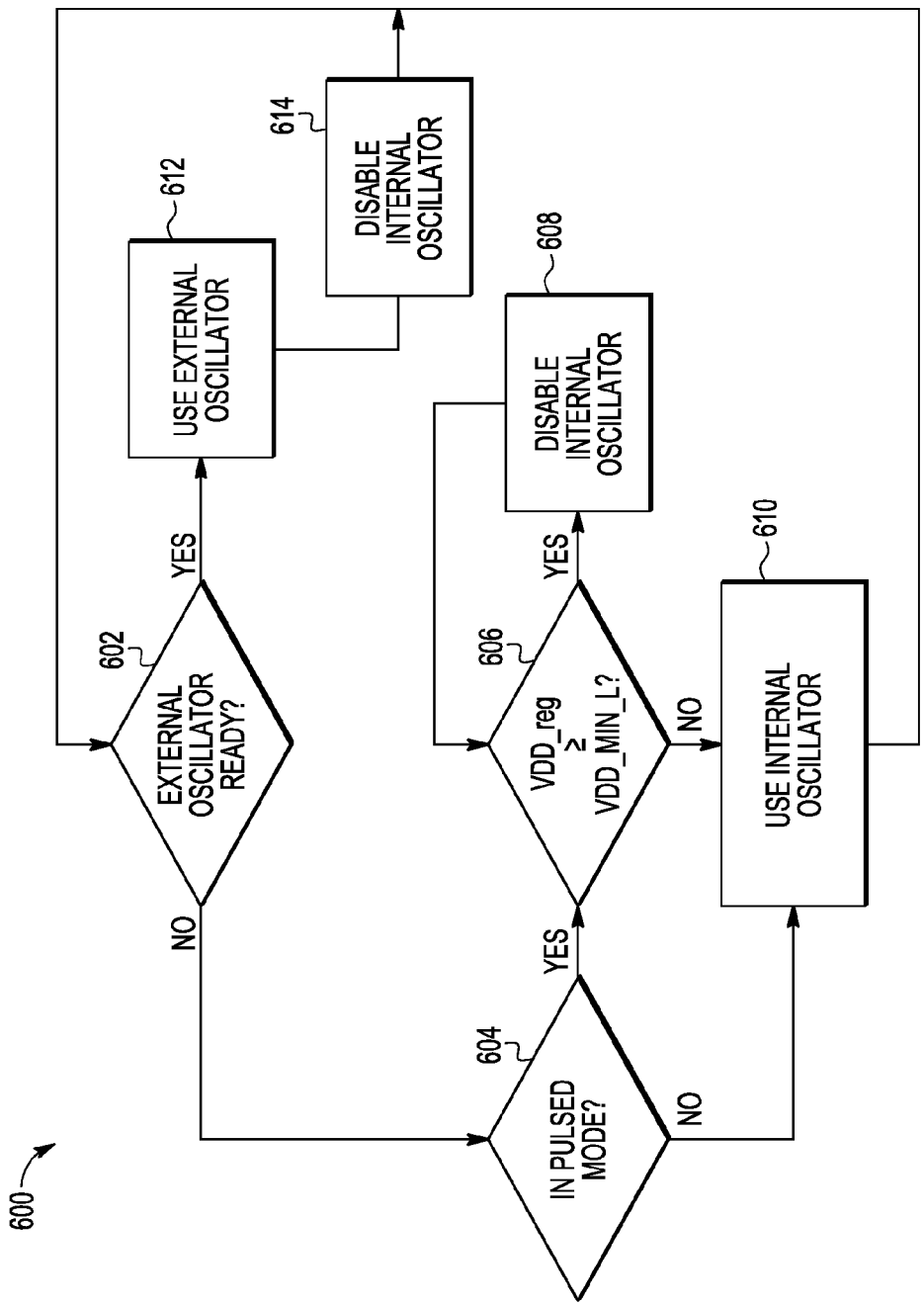
FIG. 6 shows a flow diagram of an embodiment of a method for determining when to use an internal oscillator in the connectivity processing system of FIG. 1.

Oscillator 114 is internal to voltage converter 106 and provides a clock signal to a first input of multiplexer 116. Oscillator 118 is external to voltage converter 106 and provides a separate clock signal to a second input of multiplexer 116. The clock signal provided to multiplexer 116 from the external oscillator 118 can be delayed by delay buffer 119 as required, and can also be provided to microcontrollers 136, 140. The delayed clock signal can be out of phase with the original clock signal by a user-programmable amount. A clock select (CLK_SEL) signal can be provided from switching controller 104 to multiplexer 116 to select which clock signal to use. An example of a method for selecting the clock signal is shown in FIG. 6, as further described herein.

Oscillator 118 can send an external oscillator ready signal to switching controller 104 to indicate when the external oscillator is ready to be used by voltage converter 106 instead of oscillator 114 internal to voltage converter 106. Accordingly, oscillator 114 may be used when oscillator 118 is not available and therefore allows regulators 108-112 to continue running independently of one another even in low-power and power-down modes. Oscillator 114 may not need to be as accurate or robust as oscillator 118 since the clock signal is not provided to microcontrollers 136, 140, which may perform more time-sensitive operations. Internal oscillator 114 can have a programmable frequency that is optimized for RF performance or other suitable criteria.

FIG. 2 shows an embodiment of regulator modes that can be output by the switching controller 104 to one of regulators 108-112 coupled to provide voltage VDD_REG1 to components in a first power domain in connectivity processing system 100 of FIG. 1. The power modes can include high regulation, low regulation, or user configured modes.

High regulation mode is used when (1) the microcontroller 136 and/or 140 is in active mode or (2) the radio 136 is in active mode.

Low regulation mode is used when (1) the radio 136 is in sleep or power-down mode and the microcontroller 136 and/or 140 is in sleep or power-down modes.

User configured mode is made available to allow users to specify whether high regulation or low regulation mode is used when the radio 136 is in sleep or power down modes and the microcontroller 136 is in sleep mode.

When in high regulation mode, the regulator can run in bypass mode when VBAT is within a specified threshold slightly above VDD_REG1, buck continuous mode when VBAT is at or above the threshold above VDD-REG1, or boost continuous mode when VBAT is below VDD_REG1. When in low regulation mode, the regulator can run in bypass mode when VBAT is within a specified threshold slightly above VDD_REG1, buck pulsed or discontinuous mode when VBAT is at or above the threshold above VDD-REG1, or boost pulsed mode when VBAT is below VDD_REG1.

The term "continuous mode" refers to a mode where the current provided by regulator 108-112 fluctuates but never goes to zero. The term "pulsed mode" or "discontinuous mode" refers to a mode where the current provided by regulator 108-112 fluctuates and goes to zero at some point during each cycle. The term "boost" refers to the output voltage from regulator 108-112 being greater than the input voltage to regulator 108-112. The term "buck" refers to the input voltage to regulator 108-112 being greater than the output voltage from regulator 108-112. The term "bypass" refers to a mode where the input voltage to regulator 108-112 is the same as the output voltage from regulator 108-112.

FIG. 3 shows an embodiment of regulator modes that can be output by the switching controller 104 to one of regulators 108-112 coupled to provide voltage VDD_REG2 to components in a second power domain in connectivity processing system 100 of FIG. 1. The power modes can again include high regulation or low regulation mode. High regulation mode can be used in a first configuration when (1) there is a high amount of input/output circuit (126) load or external circuit (124) load to system 100 and the microcontroller 136 and/or 140 is in an active mode, or (2) in a second configuration when there is a high amount of input/output circuit (126) load or external circuit (124) load to system 100 and the microcontroller 136 and/or 140 is in an active mode.

Low regulation mode can be used in the first configuration when the microcontroller 136 and/or 140 is in a power down mode, or in the second configuration when the microcontroller 136 or 140 is in a sleep or power-down mode.

When in high regulation mode, the regulator can run in bypass mode when VBAT is within a specified threshold slightly above VDD_REG2, buck continuous mode when VBAT is at or above the threshold above VDD-REG2, or boost continuous mode when VBAT is below VDD_REG2. When in low regulation mode, the regulator can run in bypass mode when VBAT is within a specified threshold slightly above VDD_REG2, buck pulsed mode when VBAT is at or above the threshold above VDD-REG2, or boost pulsed mode when VBAT is below VDD_REG2.

FIGS. 2 and 3 show examples of possible modes that can be used in system 100, but it should be noted that other modes can be used in addition to, or instead of, the modes shown. Additionally, the voltage values that are used to operate in buck, boost, bypass, and user-configurable modes can be any suitable values based on the power domains required by system 100.

Figure 4:
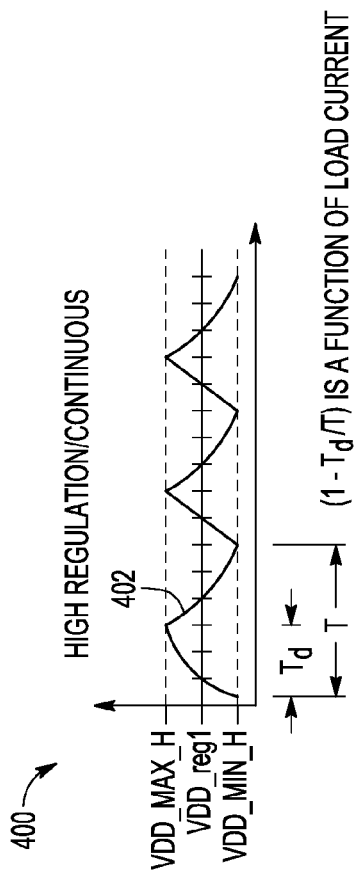
FIG. 4 shows an embodiment of a time history of voltage supplied by a capacitor having an input coupled to an output of a voltage regulator of FIG. 1 during a high regulation continuous mode.

FIG. 4 shows an embodiment of a time history 402 of voltage VDD_REG1 supplied by capacitor 122 coupled in parallel to the output of one of regulators 108-112 (FIG. 1). Capacitor 122 has an input coupled to an output of a voltage regulator of FIG. 1 during high regulation/continuous mode. At the start of a cycle, VDD_REG1 increases asymptotically from a minimum voltage VDD_MIN_H to a maximum voltage VDD_MAX_H. Once voltage 402 reaches VDD_MAX_H, VDD_REG1 decreases asymptotically back to VDD_MIN_H.

The cycle time is shown as T and the first part of the cycle where VDD_REG1 is increasing is shown as Td. The total cycle time T is inversely proportional to the current required by the components being driven by the corresponding regulator. Mathematically, one cycle of the curve for VDD_REG1 can be represented by the following:

$$\left(1 - \frac{Td}{T}\right). \quad \text{(Equation 1)}$$

Thus, when the load is high, the cycle time is short and regulators 108-112 run in continuous mode.

Figure 5:
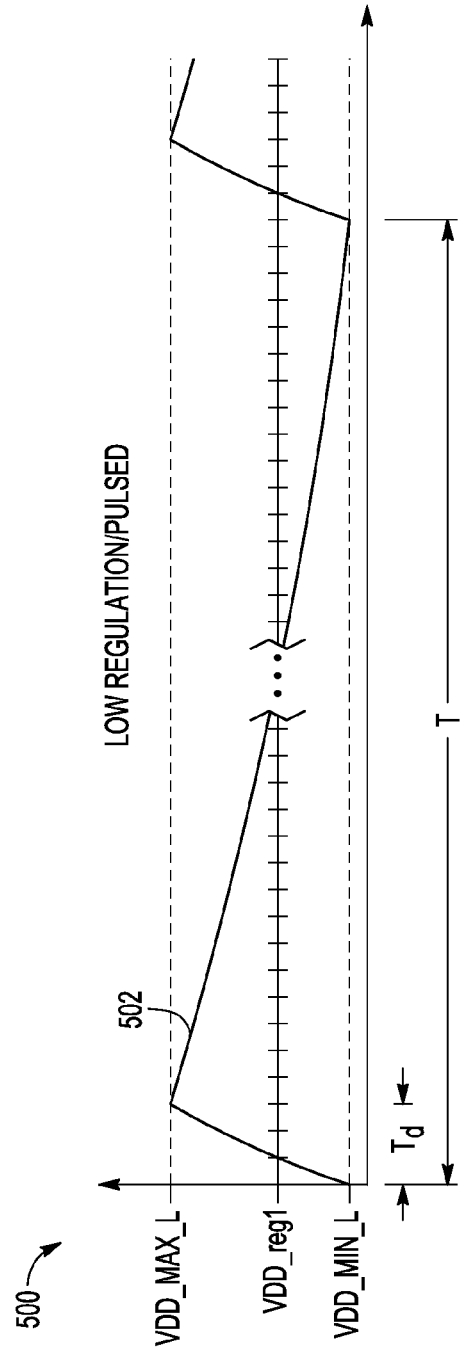
FIG. 5 shows an embodiment of a time history of voltage supplied by a capacitor having an input coupled to an output of a voltage regulator of FIG. 1 during a low regulation pulsed mode.

FIG. 5 shows an embodiment of a time history 502 of VDD_REG1 supplied by capacitor 122 coupled in parallel to the output of one of regulators 108-112 during a low regulation/pulsed mode. At the start of a cycle, VDD_REG1 increases asymptotically from a minimum voltage VDD_MIN_L to a maximum voltage VDD_MAX_L. Once voltage 502 reaches VDD_MAX_L, VDD_REG1 decreases asymptotically back to VDD_MIN_L. The amount of time required for VDD_REG1 to decrease back to VDD_MIN_L is much longer in FIG. 5 than in FIG. 4. One cycle of the time history 502 for VDD_REG1 can be represented by the equation (1) shown above. Thus, when the load is low, the cycle time is long and regulators 108-112 can run in pulsed mode because they do not need to continually charge capacitor 122.

Referring to FIGS. 1 and 6, FIG. 6 shows a flow diagram of an embodiment of a method 600 for determining when to use an internal oscillator 114 in connectivity processing system

100 of FIG. 1. Method 600 can be performed by switching controller 104 or other suitable component or combination of components of system 100.

Process 602 determines whether external oscillator 114 is ready to supply a clock signal to regulators 108-112. If external oscillator 114 is not ready to send a clock signal to regulators 108-112, process 604 determines whether each regulator 108-112 is operating in pulsed mode independently of other regulators 108-112. If a regulator 108-112 is operating in pulsed mode, process 606 determines whether the voltage VDD_REG provided by regulator 108-112 is greater than or equal to a respective minimum voltage (VDD_MIN_L). If the voltage VDD_REG provided by regulator 108-112 is greater than or equal to a respective minimum voltage (VDD_MIN_L), an indicator is set for the regulator to indicate internal oscillator 114 can be disabled to conserve power since the clock signal from internal oscillator 114 is only used by regulators 108-112. If the indicators for all regulators 108-112 indicate that internal oscillator 114 can be disabled, then internal oscillator 114 is disabled. Processes 608 transitions to process 606, and processes 606 and 608 remain in a loop until the respective voltage VDD_REG provided by one or more of regulators 108-112 is below the respective minimum voltage VDD_MIN_L.

When the respective voltage VDD_REG provided by one or more of regulators 108-112 is below the respective minimum voltage VDD_MIN_L, process 606 transitions to process 610 to generate a clock signal using internal oscillator 114. Process 610 transitions to process 602 to determine whether external oscillator 118 is ready.

When external oscillator 602 is ready, process 612 includes generating a clock signal for regulators 108-112 using external oscillator 118. Process 614 then disables internal oscillator 114 since external oscillator 118 will supply the clock signal to regulators 108-112.

By now it should be appreciated that there has been provided a system 100 with embedded power management features that manage the power domain of a first group of components such as radio 134, primary microcontroller 140 and an optional second microcontroller or radio 136, independently of the power domain of a second group of components such as external circuits 124, I/O circuits 126, logic circuits 128, and analog circuits 132. PMC 138 allows microcontroller 140 and transceiver/microcontroller 136 to be in different power modes. For example, while radio 134 is inactive but needs to retain its state, radio 134 can be placed in low power mode using state retention power gating (SRPG), while the microcontroller 140 can be placed in a power gated mode that that retains at least some of the data in RAM to reduce current further than SRPG allows. Voltage converter 106 in system 100 further includes internal oscillator 114 that supplies a clock signal to regulators 108-112 even when external oscillator 118 is not ready. The internal clock signal allows different regulators 108-112 to provide power at a required level to different domains when the external oscillator is not available. The level of voltage provided by a battery is used to determine whether each of regulators 108-112 is in low or high regulation and corresponding buck, boost or bypass mode. Thus the ability to place one power domain in a mode that requires less power than another domain allows system 100 to conserve more power than systems that require both domains to be in the same mode.

In some embodiments, a system (100) includes a voltage converter (106) configured to provide a first output voltage (VDD_REG1) at a first output terminal, wherein the first output voltage is from a first group comprising a first high regulation voltage (400), a first low regulation voltage (500), and a battery voltage (VBAT—in bypass). A first plurality of circuits (134, 136) having power supply terminals is coupled to the first output terminal. A power control circuit (140+104) uses information about operational states of the plurality of circuits to direct the voltage converter to provide the first output voltage from the first group appropriate for the operational states of the first plurality of circuits.

In another aspect, the power control circuit can include a controller (140) having a power supply terminal coupled to the first output terminal and configured to provide a first configuration signal indicating the operational states the first plurality of circuits. A switching controller (104) can be configured to receive the first configuration signal from the controller and directing the voltage converter to provide the first output voltage from the first group appropriate for the operational states of the first plurality of circuits indicated by the configuration signal.

In another aspect, the first group is further characterized by the first high regulation voltage and the first low regulation voltage being boosted by a first regulator (106) of the voltage converter.

In another aspect, the first group is further characterized by the first high regulation voltage and the first low regulation voltage being bucked by a first regulator of the voltage converter.

In another aspect, the first group further comprises a first boosted high regulation voltage and a first boosted low regulation voltage.

In another aspect, a first oscillator (114) is configured to be functional at start-up of the system, a second oscillator (118) configured to provide a first output for a system clock and a second output coupled to the voltage converter, and a programmable delay circuit (119) coupled to the second oscillator configured to provide the first output and the second output out of phase with each other by a programmable amount.

In another aspect, the voltage converter comprises a first regulator (108) and a second regulator (110). The first regulator is configured to provide the first output voltage.

In another aspect, the system includes a second plurality of circuits (124, 126, 128). The second regulator is configured to provide a second output voltage at a second output terminal, wherein the second output voltage is from a second group comprising a second high regulation voltage, a second low regulation voltage, and the battery voltage. The second plurality of circuits have power supply terminals coupled to the second output terminal. The controller is further configured to provide a second configuration signal further indicating an operational state of each circuit of the second plurality of circuits. The switching controller is further configured to receive the second configuration signal from the controller and direct the second regulator to provide the second output voltage from the second group appropriate for the operational states of the second plurality of circuits indicated by the second configuration signal. The second output voltage is a different magnitude from the first output voltage.

In another aspect, the second group is further characterized by the second high regulation voltage and the second low regulation voltage being boosted by a first regulator of the voltage converter.

In another aspect, the second group is further characterized by the second high regulation voltage and the second low regulation voltage being bucked by a first regulator of the voltage converter.

In another aspect, the second group further comprises a second boosted high regulation voltage and a second boosted low regulation voltage.

In another aspect, a circuit of the first plurality of circuits is a first analog circuit (134), further comprising a first filter (133) coupled between the transceiver and the first output terminal.

In another aspect, the first analog circuit is a transceiver (134).

In another aspect, a power management circuit (138) is coupled between the controller and the first output terminal.

In another aspect, the switching controller is configured to receive load information from the voltage converter to determine if the switching controller needs to select a different first output voltage from the first group for the voltage converter to provide to the first output terminal.

In another embodiment, a method of operating a system can include identifying operational states of a first plurality of circuits (136, 134) coupled to a first power supply terminal. A power converter (106) can be configured to be able to provide any one of a first group of first supply voltages to the first power supply terminal, wherein the group comprises a first high regulation voltage (400), a first low regulation voltage (500), and a battery voltage (VBAT). A first supply voltage is selected from the group of first supply voltages to apply to the first power supply terminal based on the operational states of the first plurality of circuits.

In another aspect, the method can further include monitoring loading of the first supply voltage applied to the first power supply terminal to determine if a different one of the first group should be applied to the first power supply terminal.

In another aspect, the method can further include identifying operational states of a second plurality of circuits (124, 126, 128, 130) coupled to a second power supply terminal. The power converter can be configured to be able to provide any one of a second group of second supply voltages to the second power supply terminal, wherein the group comprises a second high regulation voltage, a second low regulation voltage, and the battery voltage, wherein a magnitude of the second high regulation voltage is different than a magnitude of the first high regulation voltage. A second supply voltage can be selected from the group of second supply voltages to apply to the second power supply terminal based on the operational states of the second plurality of circuits.

In still another embodiment, a system can comprise a plurality of circuits (134, 136) having a power supply terminal, and a regulator (108) capable of supplying any one of a group of power supply voltages to the power supply terminal. The group comprises a high regulation circuit (400), a low regulation circuit (500), and a battery voltage (VBAT). A selection circuit (104) can also be included that selects which of the group is to be applied to the power supply terminal based upon the battery voltage and operating states of the plurality of circuits, wherein the operating states comprise power-down, sleep, and active.

In another aspect, the selection circuit monitors the loading of the regulator to determine if a different one of the group should be selected to be applied to the power supply terminal.

Because the apparatus implementing the present disclosure is, for the most part, composed of electronic components and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

Although the disclosure has been described with respect to specific conductivity types or polarity of potentials, skilled artisans appreciated that conductivity types and polarities of potentials may be reversed.

Some of the above embodiments, as applicable, may be implemented using a variety of different processing systems. For example, although FIG. 1 and the discussion thereof describe an exemplary processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. Also for example, system 100 or portions thereof may be soft or code representations of physical circuitry or of logical representations convertible into physical circuitry. As such, system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is implemented in a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system, comprising:
   a voltage converter configured to provide a first output voltage at a first output terminal, wherein the first output voltage is from a first group comprising a first high regulation voltage, a first low regulation voltage, and a battery voltage;
   a first plurality of circuits having power supply terminals coupled to the first output terminal; and
   a power control circuit that uses information about operational states of the plurality of circuits to direct the voltage converter to provide the first output voltage from the first group appropriate for the operational states of the first plurality of circuits, wherein a circuit of the first plurality of circuits is a first analog circuit, further comprising a first filter coupled between a transceiver and the first output terminal.

2. The system of claim 1, wherein the first group is further characterized by the first high regulation voltage and the first low regulation voltage being boosted by a first regulator of the voltage converter.

3. The system of claim 1, wherein the first group is further characterized by the first high regulation voltage and the first low regulation voltage being bucked by a first regulator of the voltage converter.

4. The system of claim 3, wherein the first group further comprises a first boosted high regulation voltage and a first boosted low regulation voltage.

5. The system of claim 1, further comprising a first oscillator configured to be functional at start-up of the system, a second oscillator configured to provide a first output for a system clock and a second output coupled to the voltage converter, and a programmable delay circuit coupled to the second oscillator configured to provide the first output and the second output out of phase with each other by a programmable amount.

6. The system of claim 1, wherein the power control circuit comprises:
   a controller having a power supply terminal coupled to the first output terminal configured to provide a first configuration signal indicating the operational states the first plurality of circuits; and
   a switching controller configured to receive the first configuration signal from the controller and directing the voltage converter to provide the first output voltage from the first group appropriate for the operational states of the first plurality of circuits indicated by the configuration signal.

7. The system of claim 6, wherein the voltage converter comprises a first regulator and a second regulator, wherein the first regulator is configured to provide the first output voltage.

8. The system of claim 7, further comprising a second plurality of circuits, wherein:
   the second regulator is configured to provide a second output voltage at a second output terminal, wherein the second output voltage is from a second group comprising a second high regulation voltage, a second low regulation voltage, and the battery voltage;
   the second plurality of circuits have power supply terminals coupled to the second output terminal;
   the controller is further configured to provide a second configuration signal further indicating an operational state of each circuit of the second plurality of circuits; and
   the switching controller is further configured to receive the second configuration signal from the controller and direct the second regulator to provide the second output voltage from the second group appropriate for the operational states of the second plurality of circuits indicated by the second configuration signal, wherein the second output voltage is a different magnitude from the first output voltage.

9. The system of claim 8, wherein the second group is further characterized by the second high regulation voltage and the second low regulation voltage being boosted by a first regulator of the voltage converter.

10. The system of claim 8, wherein the second group is further characterized by the second high regulation voltage and the second low regulation voltage being bucked by a first regulator of the voltage converter.

11. The system of claim 10, wherein the second group further comprises a second boosted high regulation voltage and a second boosted low regulation voltage.

12. The system of claim 1, wherein the first analog circuit is a transceiver.

13. The system of claim 12, further comprising a power management circuit coupled between the controller and the first output terminal.

14. The system of claim 6, wherein the switching controller is configured to receive load information from the voltage converter to determine if the switching controller needs to select a different first output voltage from the first group for the voltage converter to provide to the first output terminal.

15. A method of operating a system, comprising:
- identifying operational states of a first plurality of circuits coupled to a first power supply terminal;
- configuring a power converter to be able to provide any one of a first group of first supply voltages to the first power supply terminal, wherein the group comprises a first high regulation voltage, a first low regulation voltage, and a battery voltage;
- selecting a first supply voltage from the group of first supply voltages to apply to the first power supply terminal based on the operational states of the first plurality of circuits; and
- monitoring loading of the first supply voltage applied to the first power supply terminal to determine if a different one of the first group should be applied to the first power supply terminal.

16. The method of claim 15, further comprising:
- identifying operational states of a second plurality of circuits coupled to a second power supply terminal;
- configuring the power converter to be able to provide any one of a second group of second supply voltages to the second power supply terminal, wherein the group comprises a second high regulation voltage, a second low regulation voltage, and the battery voltage, wherein a magnitude of the second high regulation voltage is different than a magnitude of the first high regulation voltage; and
- selecting a second supply voltage from the group of second supply voltages to apply to the second power supply terminal based on the operational states of the second plurality of circuits.

17. A system, comprising:
- a plurality of circuits having a power supply terminal;
- a regulator capable of supplying any one of a group of power supply voltages to the power supply terminal, wherein the group comprises a high regulation circuit, a low regulation circuit, and a battery voltage; and
- a selection circuit that selects which of the group is to be applied to the power supply terminal based upon the battery voltage and operating states of the plurality of circuits, wherein the operating states comprise power-down, sleep, and active; and the selection circuit monitors the loading of the regulator to determine if a different one of the group should be selected to be applied to the power supply terminal.

\* \* \* \* \*